W. J. BERGENS.
THERMOSTATIC COMPOUND VALVE.
APPLICATION FILED JULY 17, 1911.
1,034,064.
Patented July 30, 1912.
2 SHEETS—SHEET 2.
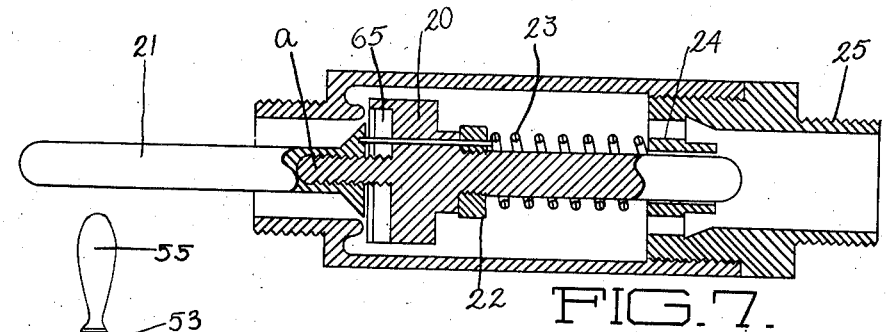
FIG. 7.
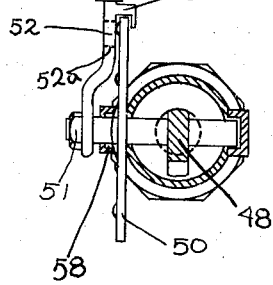
FIG. 6.
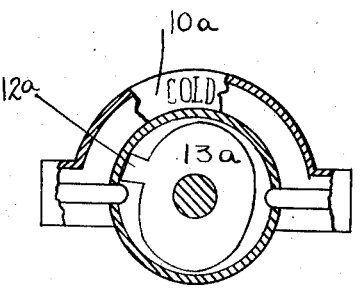
FIG. 5.
FIG. 4.
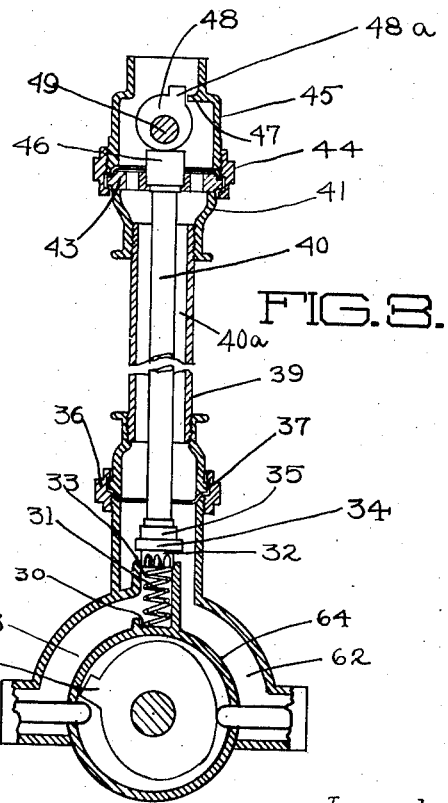
FIG. 8.
Witnesses
William Scheibel.
C. N. Whitfield.
Inventor
William J. Bergens
by
Bonnhardt & Co.
Att'ys

UNITED STATES PATENT OFFICE.

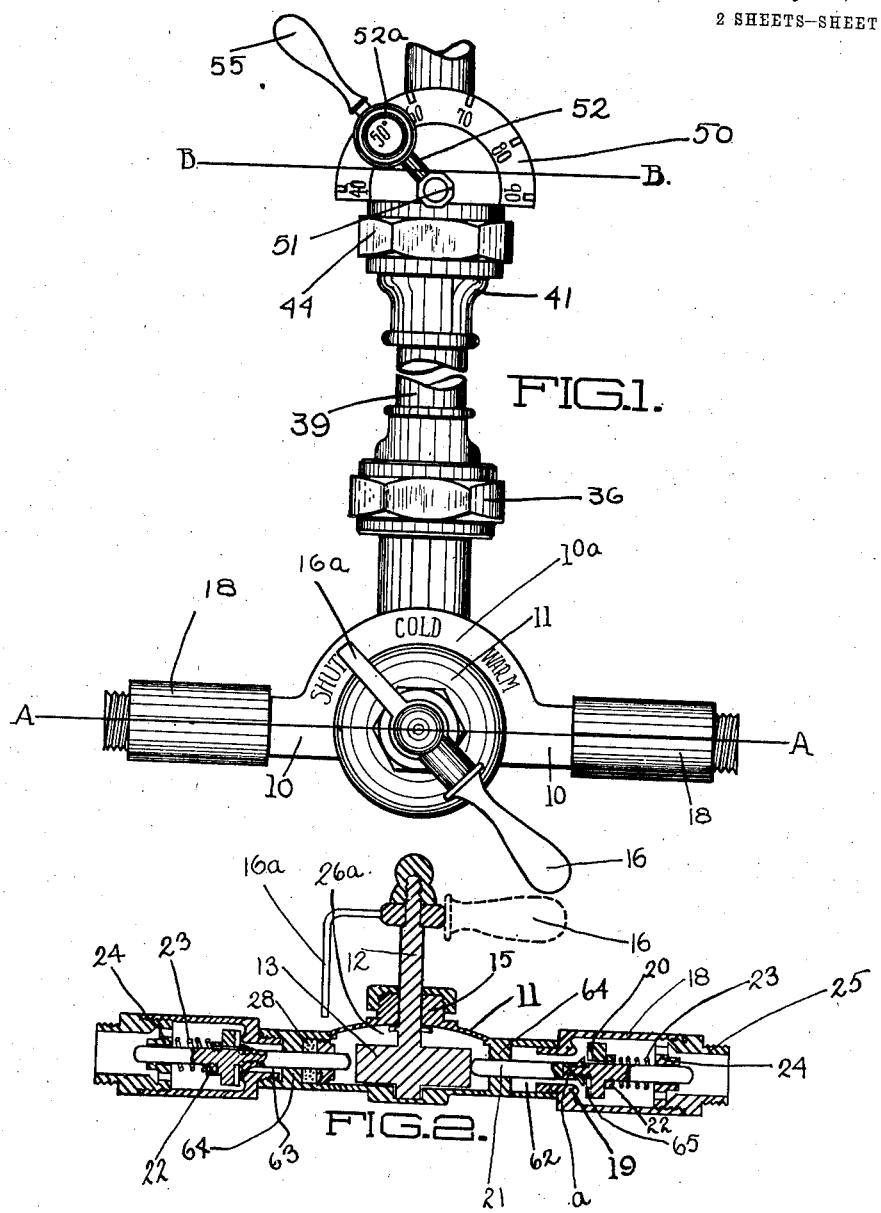

WILLIAM J. BERGENS, OF CLEVELAND, OHIO, ASSIGNOR OF ONE-FOURTH TO CARLETON L. TERRY AND ONE-FOURTH TO JOHN A. BOMMHARDT, BOTH OF CLEVELAND, OHIO.

THERMOSTATIC COMPOUND VALVE.

1,034,064.

Specification of Letters Patent. Patented July 30, 1912.

Application filed July 17, 1911. Serial No. 639,050.

*To all whom it may concern:*

Be it known that I, WILLIAM J. BERGENS, citizen of the United States, residing at Cleveland, in the county of Cuyahoga and State of Ohio, have invented certain new and useful Improvements in Thermostatic Compound Valves, of which the following is a specification.

This invention relates to compound valves, particularly to such valves as are used for mixing hot and cold water as in shower baths or the like.

The object of the invention is to provide such a valve with means for preventing water being delivered at a temperature higher than desired, said means consisting in the embodiment shown, of a thermostat which controls a secondary valve in the hot water conduit, said thermostat being governed or actuated by the water, and acting to close the secondary valve when the water is too hot. In short the invention provides a thermostatic control for mixing valves.

The valve is particularly useful in connection with shower baths, in the use of which accidents by scalding are quite frequent, which my device is adapted to prevent.

The valve comprises a casing into which stems of hot and cold water valves extend, the stems being actuated by cams of desired construction. In addition to the valves mentioned, a secondary hot water valve is placed in the outlet pipe, and this secondary valve is controlled by a thermostat located in a mixing chamber above said valve. Said mixing chamber is provided with a strainer to thoroughly mix the water before leaving the outlet. The thermostat is adjustable by means of an eccentric and handle, the handle working beside a dial to indicate the temperature of the water.

In the accompanying drawings—Figure 1 is a front elevation of the valve. Fig. 2 is a section at the line A—A of Fig. 1. Fig. 3 is a partial vertical section, showing particularly the thermostat. Figs. 4 and 5 are details of modifications of the cam for operating the hot and cold water valves. Fig. 6 is a section on the line B—B of Fig. 1. Fig. 7 is an enlarged detail in section of one of the valves.

Referring specifically to the drawings, 10 indicates the main valve casing having on one side a cap 11 provided with a stuffing box 15 through which extends an operating stem 12 with a cam 13 thereon in the casing, said cam having a stop 12ª which strikes the valve stems to limit the movement of the cam. The stem has an operating handle 16 with a pointer 16ª which indicates on a dial 10ª.

The hot and cold water valves are similarly constructed and a description of one will answer for both, with the explanation, however, that the cam is so constructed that the cold water valve, shown at the right in Figs. 1 and 2, opens before the hot water valve which is shown at the left, the stem of the hot water valve being slightly spaced from the cam at the beginning of the movement.

18 is the valve casing or tube, screwed into the body 10, which has outer passages 62 and 63 leading respectively from the cold and hot water inlets, said passages being separated from the chamber containing the cam 13 by a wall 64. Each valve barrel 18 has therein a valve seat 19.

20 is the valve disk, with a facing 65, and a screw *a* which screws into e stem 21. This stem extends through a hole in the wall 64, to position for engagement by the cam 13.

22 is a lock nut and 23 is a spring confined between the nut and the perforated guide 24.

25 is a follower behind the guide, to which the appropriate supply pipe will be connected.

The wall 64 has at the top thereof a socket 30 for the lower end of the spring 31, and 32 is a valve seat at the upper end of the hot water passage 63.

33 is a recessed guide for the secondary valve 34, which is a disk provided with a cap 35.

37 is a union between the upright pipe 39 and the valve body and 36 is the nut of the union.

40 is a thermostatic rod connected to the valve 34 and extending through the pipe 39, with a space 40ª between the rod and the pipe.

41 is the body of the upper union and 44 its nut connecting to a top bonnet 45.

43 is a strainer with a guide for the cap 46 at the upper end of the thermostatic rod.

48 is an eccentric mounted on a shaft 49 extending across the bonnet 45 and said eccentric has a projection 48ª which stops against a stop 47 to limit its movement. The outer end of the shaft 49 has a lever 52 with a handle 55, said lever operating in front of an indicator dial 50 and being fastened to the shaft by a nut 51. The lever has a catch 53, and also has an opening or hole 52ª through which can be seen any of the temperature marks on the dial.

58 is the stuffing box for the eccentric shaft.

The space 26ª in the inner cavity of the valve body is filled with grease.

As stated, one of the inlets, that at the right in the drawings, is for cold water and the other for hot. When the cam 13 is turned by means of the handle 16, the cold water is first turned on, and after the flow of cold water is obtained the operator may continue turning the handle and gradually turn on the hot water, the hot water valve opening to a lesser extent than the cold water, so that the temperature of the water at the outlet can never rise sufficiently to cause scalding, even if the thermostat be out of order. The water from the two valves passes through the passages 62 and 63 to the mixing chamber 40ª and thence out through the strainer. If the water is too hot, it will elongate the rod 40 which will close the valve 34, more or less, and so control the quantity of hot water delivered, and as shown the action of the thermostat may be adjusted by means of the cam 48 and handle 55, the thermostat acting against the spring 31. By turning handle 55 the temperature of the water may be varied as desired, so that the temperature of the water will not rise above that indicated on the upper dial. This control will be effective even should the hot water supply be at the boiling point, or even if the hot water pressure should be greater than that of the cold water. The latter is often the case in high buildings where the hot water supply is obtained from an elevated tank on the roof or upper floor, and when such floors are above the city pressure, as only a certain quantity of hot water is allowed to mix with the cold water, regardless of what the pressure may be on either supply.

Modified forms of cams are shown in Figs. 4 and 5, the former 13ª being shaped for a self-closing valve and the latter, 13ᵇ, being shaped to open the hot water valve full and so give a range from cold to hot. The valves 20 are self closing, the springs 23 being used only to take up the tension. The valve parts may be readily separated and removed for repair or otherwise. The grease in the space 26ª will act as a lubricant on all wearing parts insuring very little wear or friction.

Around the inner end of the valve stem of the hot water valve, which is shown at the left in Fig. 2, is a packing or gland 28. This is important as it prevents hot water entering the chamber 26ª which contains the grease, and prevents the escape of grease to the outlet, as the only pressure exerted on the grease is in consequence of such leak as may occur from the cold water side, which tends to compress the grease and allows of no escape thereof, thereby assuring perfect lubrication in the cam chamber at all times.

By reason of the particular shape of the cam, and the setting of the valve stems parallel to each other and at opposite ends of the cam chamber, both valves may be opened fully, and assuming that they each permit one half inch flow, will make a substantial equivalent of a three quarter inch flow at the delivery port where both combine.

The cam may be set or turned from one side of the chamber to the other, so as to act first on the cold water irrespective of the particular location of the hot and cold water pipes. In regular practice it is usual to place the hot water pipe on the left hand side and the cold water pipe on the right hand side, and on this plan most valves are made and are not interchangeable, and if set the other way the pipes must be crossed. With this valve it is immaterial at what side the hot or cold water is, because the cam can be set accordingly. This avoids the cutting of walls or partitions and the crossing of pipes, the only thing being required to reverse the cam. This change may be made without any change in the remainder of the valve.

Having thus described my invention, what I claim as new and desire to secure by Letters Patent is:—

1. The combination with a mixing chamber and separate supply passages thereto, of a primary valve in each of said passages, and a secondary thermostatic valve in one of said passages, actuated by the temperature of the fluid in the mixing chamber.

2. The combination of a mixing valve having a plurality of inlet passages and an outlet passage, valves in said inlet passages, a thermostat in said outlet passage, and a valve connected to the thermostat for operation thereby and located between one of the inlet passages and the outlet passage.

3. The combination of a compound valve casing having a plurality of inlet passages and a mixing chamber, valves in said passages, a secondary valve located between one of said passages and the mixing chamber, and a thermostatic rod operating against said secondary valve and located in the mixing chamber, and tending to close the valve as the temperature increases in the said chamber.

4. The combination of a compound valve casing having a plurality of inlets thereto, valves controlling said inlets, a tube connected to the casing and forming the outlet therefrom, a valve between one of the inlets and said tube, to control the flow from said inlet to the tube, and a thermostatic rod located within the tube and bearing against the last mentioned valve, and tending to close the same as the temperature in the tube increases.

5. The combination of a compound valve casing having a plurality of inlets and an outlet and a central chamber between said inlets, valves in said inlets, means extending into said chamber to operate the valves, a valve seat located at the end of one of said passages where it communicates with the outlet, a pipe connected to said outlet, a thermostatic rod supported in said pipe, and a valve at one end of the thermostatic rod and coöperating with said seat and adapted to be closed by expansion of the rod.

In testimony whereof, I do affix my signature in presence of two witnesses.

WILLIAM J. BERGENS.

Witnesses:
JOHN A. BOMMHARDT,
J. B. DANS.